United States Patent [19]
Bürger

[11] Patent Number: 4,984,450
[45] Date of Patent: Jan. 15, 1991

[54] METHOD OF LEAK TESTING A TEST CONTAINER WITH A TRACER GAS

[75] Inventor: Heinz D. Bürger, Wertheim, Fed. Rep. of Germany

[73] Assignee: Alcatel Cit, Paris, France

[21] Appl. No.: 397,925

[22] Filed: Aug. 23, 1989

[30] Foreign Application Priority Data

Aug. 23, 1988 [DE] Fed. Rep. of Germany ......... 382858

[51] Int. Cl.$^5$ ............................................. G01M 3/20
[52] U.S. Cl. .................................................. 73/40.7
[58] Field of Search ........................................ 73/40.7

[56] References Cited

U.S. PATENT DOCUMENTS 4,409,817 10/1983 Edwards Jr. ..................... 73/40.7
4,773,256 9/1988 Saulgeot ............................ 73/40.7

FOREIGN PATENT DOCUMENTS 808892 2/1981 U.S.S.R. ............................. 73/40.7
1310657 5/1987 U.S.S.R. ............................. 73/40.7

*Primary Examiner*—Hezron E. Williams
*Assistant Examiner*—Joseph W. Roskos
*Attorney, Agent, or Firm*—Sughrue, Mion, Zinn, McPeak & Seas

[57] ABSTRACT

The invention relates to a method of leak testing a test container. A tracer gas such as helium is sprayed around the test container on its outside, and the inside of the container is evacuated and connected to a tracer gas detector. Prior to the actual leak test, the test container (1) is temporarily connected to a water tank (7) containing water free from dissolved gases.

2 Claims, 1 Drawing Sheet

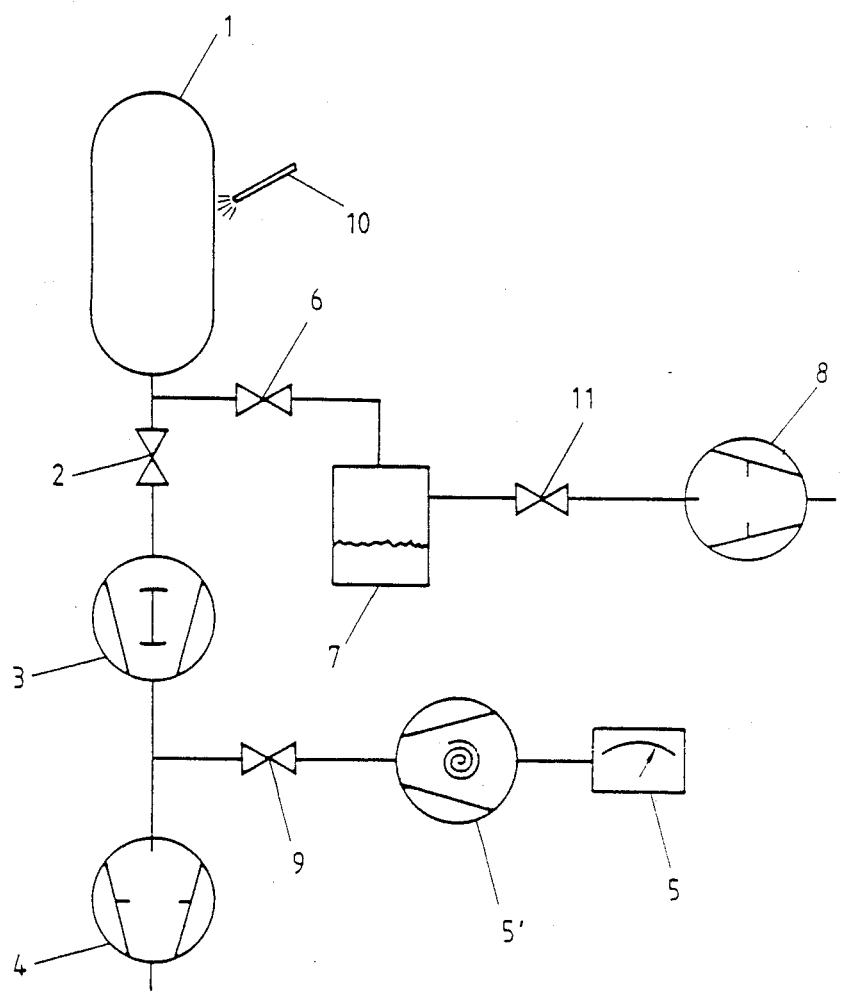

METHOD OF LEAK TESTING A TEST CONTAINER WITH A TRACER GAS

FIELD OF THE INVENTION

The invention relates to a leak testing method for a component, in particular a test container, according to which a tracer gas is directed to one side of the component and the space on the other side is evacuated and connected to a tracer gas detector.

STATE OF THE ART

Such methods, for which helium in particular is used as a tracer gas, are common practice. When using a molecular pump for evacuating the container volume and a mass spectrometer for detecting helium atoms, relatively small leaks can be detected reliably. With decreasing leak rate, i.e. increasing detection sensitivity, the measurement is falsified by helium atoms which have not penetrated through a leak into the detector or the mass spectrometer, but which were already there prior to the measuring step. Although helium deposits very little on metal surfaces because of its stable and symmetric electron configuration, it nevertheless diffuses into organic materials, such as seals for example, and cannot easily be removed therefrom. As a result, when a container under test is evacuated below atmospheric pressure, the "helium background" takes a very long time to decrease. This results either in very long pumping periods, which are incompatible with industrial manufacture, or in oversized pump assemblies, which are expensive.

It might be thought that the container and the measuring apparatus could be flushed out with an inert gas such as nitrogen prior to the measuring step, but such a gas generally contains as many helium atoms as there are in the normal atmospheric air, so that even after such a flushing process, very low leak rates still cannot be detected.

OBJECT OF THE INVENTION

It is the object of the invention to improve the leak testing method mentioned above in such a way as to make it possible to eliminate the helium background which impairs the detection of very low leak rates in a very short time and without using overdimensioned pump assemblies

SUMMARY OF THE INVENTION

This object is achieved by a method in which a tracer gas is directed to one side of the component and the space on the other side is evacuated and connected to a tracer gas detector, the method including the additional step of temporarily connecting the space on said other side of the component to a water tank containing water which is free from dissolved gases, this additional step being performed prior to the actual leak test.

Preferably, prior to being connected with the water tank, the test container is evacuated to a pressure in the range 1 mbar to 0,01 mbar, preferably 0,1 mbar.

The invention makes use of the fact that water is relatively easily freed of dissolved gases by evacuation and heating. The resulting effect is surprisingly more effective than could be expected from an overall calculation of dilution. Apparently, water molecules "pull" helium atoms away from polluted organic surfaces.

BRIEF DESCRIPTION OF THE DRAWING

The single FIGURE is a schematic diagram of a leak detection system for practicing a leak testing method in accordance with the present invention.

DETAILED DESCRIPTION OF THE INVENTION

The sole accompanying diagrammatic figure shows a container 1 which is submitted to a helium leak test using the method of the invention.

The container is connected via a valve 2 to a two-stage pump assembly which for example comprises a molecular pump 3 and a mechanical primary pump 4. A mass spectrometer 5, which selectively detects the helium atoms, is connected to the link between the two pumps via a spiromolecular pump 5' and a valve 9.

A water tank 7, which is partially filled with degassed pure water and whose gas space can be evacuated via an auxiliary vacuum pump 8 connected via a valve 11, is also connected to the test container via a further valve 6.

The water in the water tank 7 has been degassed by evacuation and possibly by heating.

Prior to the actual leak test, the test container 1 is evacuated via the pumps 3 and 4 to 0,1 mbar for example. The pressure in the water tank 7 is simultaneously adjusted to a predetermined value between 20 and 50 mbar by means of the auxiliary vacuum pump 8. This pressure is defined by electrically heating the tank (by means not shown) and by performing a dew-point measurement. The valve 6 is then opened so that water vapour can penetrate into the test container. The pressure in the test container thus increases for a short time, for example to 23 mbar, but quickly decreases again when the pumps 3 and 4 are in operation. In this way, any heliums atoms which ma still be present in the test container 1 or the ducts and valves are quickly removed. Instead of maintaining the connection of the water tank for a predetermined time period, it may be useful to maintain the connection until the helium background as simultaneously measured in the mass spectrometer 5 decreases below a threshold value. The valve 6 to the water tank is then closed and the container is sprayed on the outside with a helium spray gun 10. Even smallest leaks, which have been lost in the past in the "background" or "noise", are now detected by the mass spectrometer 5.

The invention is not limited to testing hollow bodies such as the container 1, but is generally applicable to leak testing any components having helium directed on one side with helium detection being carried out on the other side. Similarly, the invention is applicable to containers filled with a tracer gas and placed inside a test bell. Prior to examining the bell for the presence of the tracer gas, this bell is "flushed" with H$_2$O as described above.

What is claimed:

1. A method of leak testing a component, in particular a test container, in which a tracer gas is directed to one side of the component and the space on the other side is evacuated by a two stage pump assembly comprising in series and in order a molecular pump and a mechanical primary pump and connected to a tracer gas detector, said method including the additional step of temporarily connecting said space on said other side of the component to a water tank (7) containing water which is free from dissolved gases prior to the actual leak test, and wherein, prior to being connected with the water tank, the space on the other side of the component (1) is evacuated by said two stage pump assembly to a pressure in the range of 1 mbar to 0.01 mbar. Preferably to 0.1 mbar, thereby hindering parasitic helium atoms from migrating from the primary pump to said tracer gas detector.

2. A method according to claim 1, wherein the water in the water tank (7) is previously degassed by at least one of heating and evacuation.

* * * * *